E. M. TAINTER.
CABLE CLAMP.
APPLICATION FILED OCT. 25, 1916.
1,278,785. Patented Sept. 10, 1918.
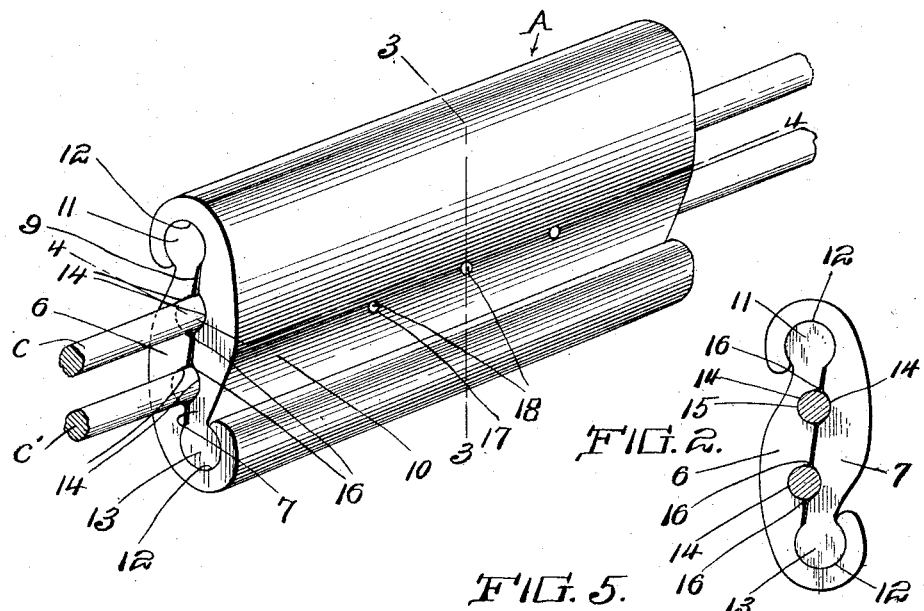
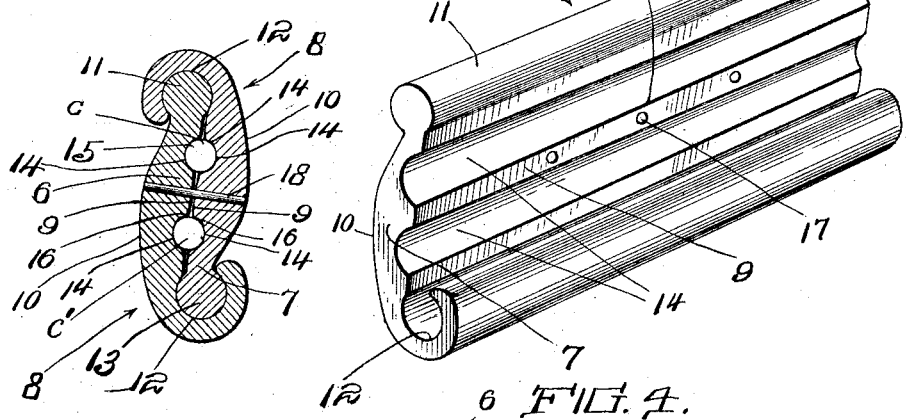
Inventor
E. M. Tainter
Witness
A. C. Newkirk
By Victor J. Evans
Attorney

UNITED STATES PATENT OFFICE.

EDWIN M. TAINTER, OF VIROQUA, WISCONSIN.

CABLE-CLAMP.

1,278,785.  Specification of Letters Patent.  Patented Sept. 10, 1918.

Application filed October 25, 1916. Serial No. 127,655.

*To all whom it may concern:*

Be it known that I, EDWIN M. TAINTER, a citizen of the United States, residing at Viroqua, in the county of Vernon and State of Wisconsin, have invented new and useful Improvements in Cable-Clamps, of which the following is a specification.

This invention relates to a clamp and more particularly to a clamp which is especially serviceable in connecting the meeting ends of cables and the like.

The primary object of the invention is to provide a clamp of this character which is formed from a pair of clamp sections each of which has a face having formed therein tapered and spaced parallel grooves, with the clamp sections so constructed that they may be slidably connected with the grooved faces arranged in confronting relation to cause the grooves therein to form channels, the walls of which through the adjustment of the clamp sections with relation to each other may be caused to bind upon the meeting ends of cables arranged therebetween to prevent the separation of the same.

Another object of the invention is to provide clamp sections each of which is provided with a tongue and a curved flange forming a channel, said tongue and flange being arranged respectively upon the opposite side edges of the clamp section whereby when an end upon one of the clamp sections is brought into confronting relation with an end on the other clamp section, the tongues on the clamp sections may be arranged in the channels formed by the flanges thereon, thus slidably connecting the clamp sections in such a manner that the tapered channel forming grooves upon one clamp section will taper in the opposite direction from the grooves upon the clamp section connected therewith whereby the binding action of the walls of the channels upon the meeting ends of the cables may be gradually increased as the sections are slid upon each other to clamping position.

A further object of the invention is to so arrange the channel forming grooves with relation to each other and to the tongues and channel forming flanges on the sections that when the clamp sections have been slid to clamping position the confronting faces of the clamp sections coact with the walls of the grooves therein in forming gripping edges to engage the meeting ends of the cables and coact with the walls of the cable receiving channels in binding upon the meeting ends of the cables to prevent the withdrawal of the same from within said channels.

A still further object of the invention is to provide the clamp with means for holding the clamp sections in adjusted position.

With these and other objects in view, the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations, and modifications, within the scope of the claim may be resorted to when desired.

In the drawing:

Figure 1 is a perspective view of the improved clamp and showing the same in applied position.

Fig. 2 is an end view of Fig. 1.

Fig. 3 is a vertical transverse section on the line 3—3 of Fig. 1.

Fig. 4 is a transverse longitudinal section on the line 4—4 of Fig. 1, the upper cable being removed from the clamp.

Fig. 5 is a detail perspective view of one of the clamp sections.

Like characters of reference denote corresponding parts throughout the several views in the drawing.

Referring now to the drawing in detail, the letter A designates the improved clamp which is formed from slidably connected sections 6 and 7 formed from any suitable material and having arranged therebetween the meeting ends of a pair of cables C and C'.

The clamp sections 6 and 7 which are substantially identical in construction each formed from a plate 8 substantially rectangular in shape and having a relatively flat face 9 and a face 10 curved transversely throughout the length of the plate, said plate being rolled adjacent one side edge to form a curved flange 11 providing a tongue receiving channel 12 extending longitudinally of the plate throughout its length, the opposite side edge of the plate forming a tongue 13 extending the entire length of the plate and substantially circular in cross section whereby, when an end upon one of the clamp sections is brought into confronting relation with an end on the other clamp section, the tongues on the clamp sections may be arranged in the channels 12 of the clamp sections thus slidably connecting the clamp sections together and with the substantially flat faces 9 of the sections arranged in confronting relation.

Each of the clamp sections 6 and 7 has formed in the face 9 thereon spaced and tapered grooves 14 extending longitudinally throughout the length of the plate and forming within the clamp when the sections are slidably connected cable receiving channels 15, the walls of which incline throughout the length of the channels and are caused to bind upon the meeting ends of the cables arranged within the channels through the adjustment of the clamp sections 6 and 7 upon each other whereby the ends of the cables are connected and prevented from being withdrawn from the clamp when the cables are in use.

The grooves 14 in one clamp section taper in the opposite direction from the grooves in the clamp section for connection therewith so that when the clamp sections are connected the binding action of the walls of the cable receiving channels 15 upon the ends of the cables arranged therein may be gradually increased as the clamp sections are slid upon each other to clamping position.

Through the above described arrangement of the grooves 14 in the clamp sections 6 and 7, it will be seen with reference to Fig. 4 in the drawing that when the sections 6 and 7 are in clamping position, the faces 9 of the sections 6 and 7 coact with the walls of the grooves therein in providing the walls of each cable receiving channel 15 with gripping edges 16 which render the binding action of the walls of the channels upon the meeting ends of the cables 8 and 9 more effective in preventing the separation of the meeting ends of the cables.

Each of the sections 6 and 7 has extending longitudinally thereof between the grooves 14 a row of transversely extending openings 17 adapted to be brought into registration with each other as the clamp sections are slid to clamping position so that a pin, or the like, designated in the drawing by the numeral 18 may be passed through the openings in said clamp sections for holding the same in adjusted position.

When it is desired to connect the meeting ends of a pair of cables by means of the improved clamp as shown in Fig. 1 in the drawing, the meeting ends of the cables are arranged in the grooves 14 in one of the clamp sections and the other clamp section positioned so that the end thereof at which is arranged the larger ends of the grooves 14 will be arranged adjacent a similar end on the first mentioned clamp section, after which the tongue 13 upon one section may be arranged in the tongue receiving channel on the other section and the sections slid to clamping position, such movement of the sections causing the walls of the cable receiving channels 15 and the gripping edges 16 to bind against the meeting ends of the cables and firmly wedge the same between the sections of the clamp so that the separation of the meeting ends of the cables is prevented after the pin 18 has been passed through the openings in said sections.

From the foregoing description, taken in connection with the accompanying drawing, it is at once apparent that a clamp for the purpose set forth has been provided which though simple in construction and, therefore, inexpensive of manufacture, is highly efficient in use.

Having thus described the invention, what is claimed as new, is:

A clamp comprising a pair of rectangular shaped plates placed one against the other, the contacting faces of said plates being straight and having longitudinally extending tapered grooves therein, the grooves in the straight face of one of said plates being oppositely tapered from the groove in the straight face of the plate in contact therewith, a tongue at one side of said plates, and a curved flange at the opposite side of each plate providing a channel in which one of said tongues is received.

In testimony whereof I affix my signature.

EDWIN M. TAINTER.